United States Patent [19]

Brandt et al.

[11] 4,263,540

[45] Apr. 21, 1981

[54] TWO-SPEED REFRIGERANT MOTOR COMPRESSOR

[75] Inventors: George W. Brandt; Charles A. Dubberley, both of Tyler, Tex.

[73] Assignee: General Electric Company, Louisville, Ky.

[21] Appl. No.: 55,086

[22] Filed: Jul. 5, 1979

[51] Int. Cl.³ .................. H02P 7/48; H02H 7/08; H02K 3/28
[52] U.S. Cl. .................. 318/775; 318/783; 318/472; 310/198; 361/27
[58] Field of Search ........... 310/180, 184, 198, 253; 318/772, 773, 774, 775, 777, 782, 783; 361/471–473, 27

[56] References Cited
U.S. PATENT DOCUMENTS

| | | |
|---|---|---|
| 1,609,310 | 12/1926 | Rodgers . |
| 1,712,065 | 5/1929 | Baker . |
| 3,167,700 | 1/1965 | Neyhouse ................. 318/775 |
| 3,584,980 | 6/1971 | Cowley et al. . |
| 3,978,382 | 8/1976 | Pfarrer et al. . |

*Primary Examiner*—J. V. Truhe
*Assistant Examiner*—Richard M. Moose
*Attorney, Agent, or Firm*—Frank P. Giacalone; Radford M. Reams

[57] ABSTRACT

A refrigerant compressor of the type driven by a single phase motor capable of operating at a low speed and a high speed. The motor, including four separate windings, a first set of high-speed two-pole auxiliary and main windings, and a second set of low-speed four-pole auxiliary and main windings all wound on the same stator core. Each set of windings is provided with independent line break protectors that enable each set of windings and protector to be optimized without affecting the other. A mandatory low-speed start system is incorporated that insures initial low-speed start even when conditions require high speed operation. Speed switching from one speed to the other is accomplished in the present system while the motor is running without causing interruption of compressor operation.

18 Claims, 4 Drawing Figures

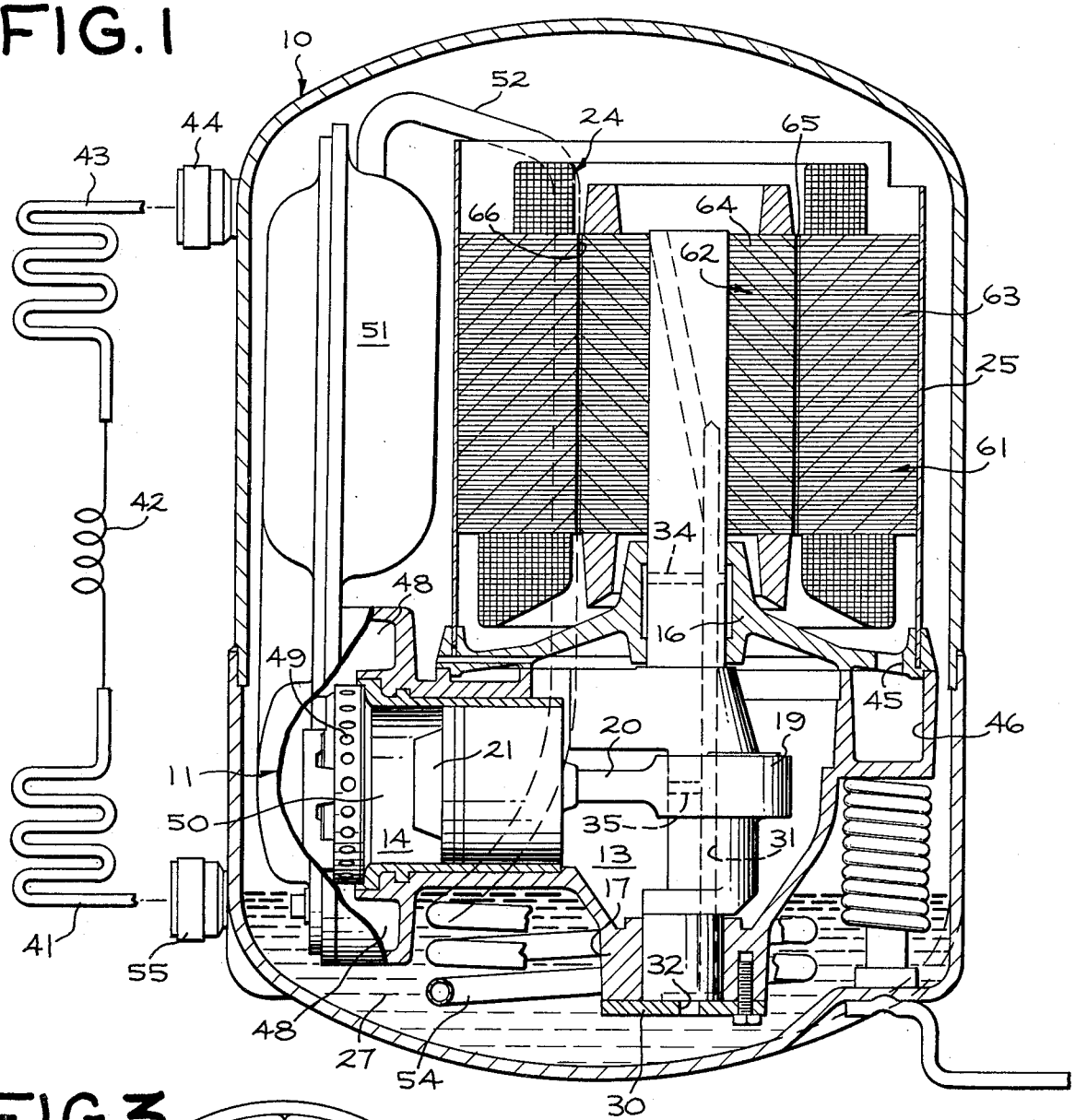

TWO-SPEED REFRIGERANT MOTOR COMPRESSOR

BACKGROUND OF THE INVENTION

This invention relates to refrigerant compressors driven by an electrical motor capable of operating at a low speed and a high speed and to the method and means for controlling the refrigerant compressor utilizing a two-speed electric motor having four separate windings, a two-pole auxiliary and main, and a four-pole auxiliary and main winding, all wound on the same core.

U.S. Pat. Nos. 1,609,310—Rodgers and 1,712,065—Baker teach two speed motors wherein windings are arranged for two separate speeds of the motor. Refrigerant compressor utilizing two-speed motors have been employed in the past. One such arrangement is shown in U.S. Pat. No. 3,584,980—Cawley et al, which discloses that a four-pole, two-winding electric motor can be utilized to provide full capacity during two-pole operation and one half capacity during four-pole operation and means for providing adequate lubrication of the crankshaft bearing surfaces during both high speed and low speed operation. U.S. Pat. No. 3,943,912 is directed to the method of controlling a two-speed motor of the type disclosed in U.S. Pat. No. 3,584,980 wherein the operation of the two-speed motor compressor system can be controlled such that the overall coefficient of performance (efficiency) of the system at the lower speed, i.e., during part load conditions, is equal to or greater than the coefficient of performance (efficiency) of the system at the higher speed during peak load conditions. A first torque load is imposed on the two-speed motor during peak load operation and under a given set of evporating and condensing conditions, and then a second torque load is imposed on the motor during part load operation and under the same set of evaporating and condensing conditions such that the ratio of the second torque load to the first torque load is equal to or less than the ratio of the motor efficiency at part load operation to the motor efficiency at peak load operation.

Other prior art teachings of a refrigerant compressor utilizing two-speed motors are shown in U.S. Pat. No. 3,978,382—Pfarrer and 4,041,542—Pfarrer, wherein temperature sensors are located adjacent each of the windings for detecting any change in temperature of the windings. A current transformer is used in combination with the temperature sensor and in the event the temperature or current conduction of any of the windings exceeds a predetermined value, a control device operates a switch in a pilot circuit that turns off power to the motor.

Another prior art teaching of a refrigerant compressor utilizing a two-speed motor is shown in U.S. Pat. No. 4,064,420—Yuda et al, which provides a control system for a pole-changing, motor-driven compressor that stops the motor in case of the pole changing thereof and starts it only after the operating conditions of the compressor change to permit the restarting of the motor, whereby the reliable and dependable pole-changing operation can be ensured and the motor may be prevented from being damaged.

An object of the present invention is to provide a system and method of controlling the operation of a hermetic two-speed, electric motor-driven refrigerant compressor so as to attain an overall motor efficiency which is substantially equal at either low or high speed operation, while providing higher overall compressor efficiency at the lower speed.

Another object of the invention is the provision of a control system wherein low speed operation of the compressor motor is controlled through a first stage switch means of the indoor thermostat.

Another object is to provide for mandatory starting of the motor in low speed and to continue low-speed operation for a predetermined period of time.

Another object is to provide for instantaneous speed switching between speeds without interrupting compressor operation.

Another object is to provide separate, internal, line break, motor protectors for each speed winding that can be optimized for each winding without affecting the other.

This and other objects and advantages of the present invention will become apparent from the following description of the preferred embodiment of the invention described in connection with the accompanying drawing.

SUMMARY OF THE INVENTION

In a hermetic refrigerant compressor of the type having a sealed outer casing containing a compressor mechanism for receiving refrigerant gas from a suction line, compressing the refrigerant gas and discharging the compressed refrigerant gas through a discharge line, and a motor for rotating drive shaft means in the compression mechanism at low speed and at high speed from a source of single phase electrical power. The motor comprises a slotted magnetic core in which a low-speed, four-pole main winding is fitted substantially evenly therein and a four-pole auxiliary winding which is arranged in a location adjacent the low speed main winding. A high-speed, two-pole winding is also fitted in the slotted core with a two-pole auxiliary winding arranged in a location adjacent the high-speed, two-pole auxiliary winding.

A first line break motor protector is arranged in intimate thermal contact with the low-speed, four-pole main and auxiliary windings and is connected electrically in series between the power source and windings for controlling power to the four-pole windings independent of said two-pole windings. A second line break motor protector is arranged in intimate thermal contact with the high-speed, two-pole main and auxiliary windings and is connected electrically in series between the power source and windings for controlling power to the two-pole windings independent of the four-pole windings whereby the compression mechanism may operate at one of said speeds when the line break of the other speed disconnects its associated winding from the power source.

The control system includes a temperature-responsive switching means having a first stage switch means and a second stage switch means. A speed selection switch means is arranged in series with the first stage switch means. The speed selection switch means being operable between a normal low-speed position for connecting the four-pole windings to the power source and to a high speed position for connecting the two-pole windings to said power source. A high-speed switch means arranged in series with the second stage switch means includes a delay means operable after a predetermined time period for switching the speed selection switch between the normal low-speed position and the high-speed position so that operation of the motor is instantaneously switched between the four-pole windings and the two-pole windings after the predetermined time delay without interrupting operation of the compressor mechanism.

BRIEF DESCRIPTION OF THE DRAWINGS

FIG. 1 is a side elevational view, partially in section with some parts broken away, of a hermetic refrigerant compressor that is driven by a two-speed electric motor;

FIG. 2 is a fragmentary view of a typical stator lamination;

FIG. 3 is a schematic showing the winding placement in the stator, including relationship of the line break motor protectors.

DESCRIPTION OF THE PREFERRED EMBODIMENT

Figure 4:
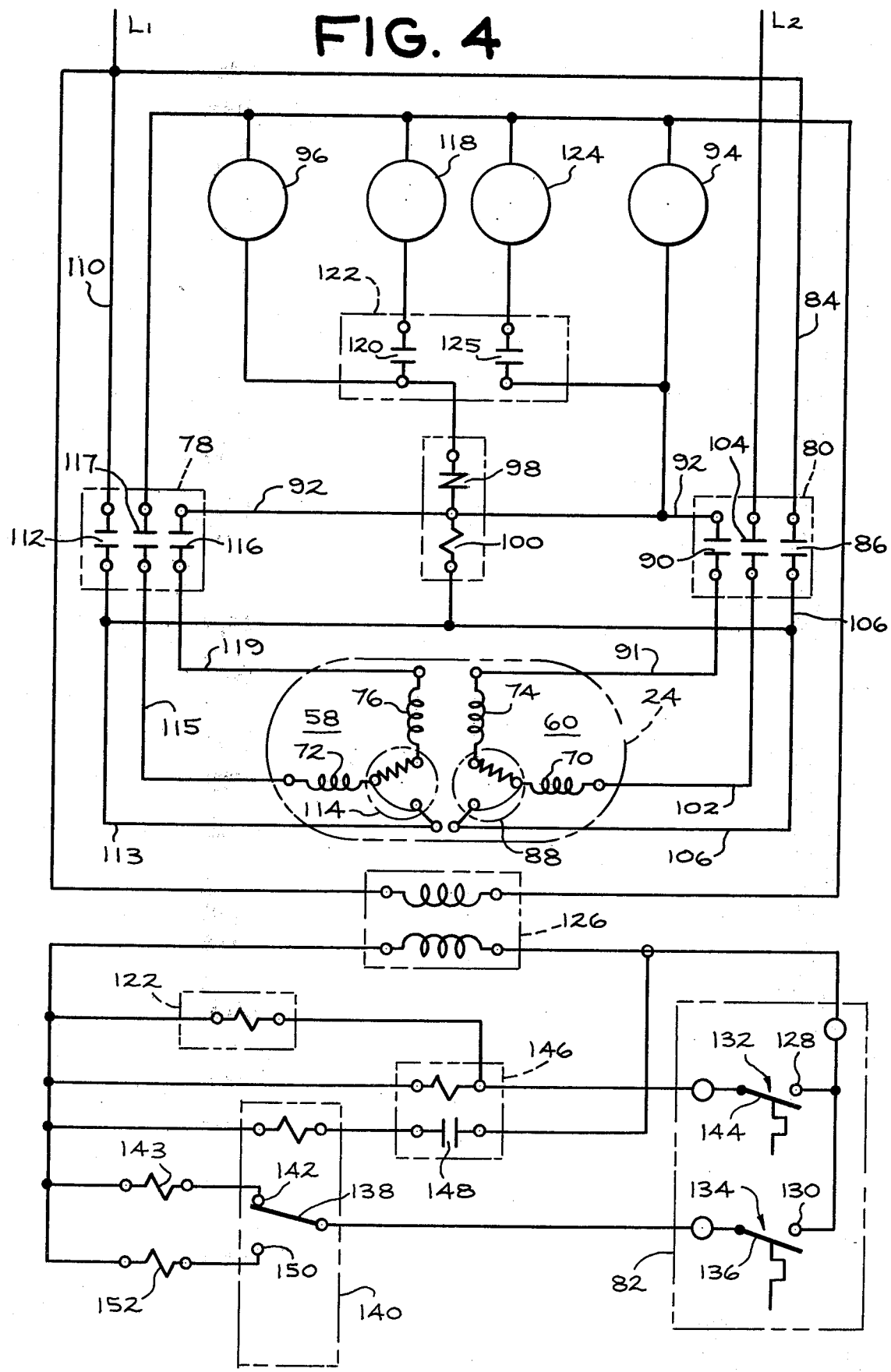
FIG. 4 is a simplified circuit diagram of the control system for the two-speed compressor.

The two-speed compressor and control system in the present embodiment is shown in conjunction with a cooling-only refrigeration system. It should be noted, however, that it can be used in conjunction with a heat pump system.

Referring to the drawing, there is illustrated a hermetic compressor unit comprising a shell or casing 10 in which is resiliently supported a motor-compressor unit 11. The unit 11 comprises a compressor block 12 defining a substantially closed crankcase 13 and at least one cylinder 14 opening into the crankcase. The compressor block 12 also includes upper and lower axially aligned bearings 16 and 17 in which is mounted a vertically extending shaft 18. The shaft 18 is connected at its upper end to the motor rotor 62 and having an eccentric bearing portion 19 at its lower end arranged between the bearings 16 and 17. A connecting rod 20 connects a piston 21 to the bearing 19. Thus, piston 21 reciprocates or slides back and forth in the cylinder 14 in response to the reciprocating forces provided by the eccentric 19 upon rotation of the shaft 18.

Means for driving the compressor 11 comprises an electric motor 24 positioned in the upper portion of the shell 10 above the compressor block 12. The motor 24 which will be described in detail hereinafter includes a stator 61 supported within a casing 25 that is secured to the unit 11 and the rotor 62 which is inductively connected to the stator 61.

The bottom of the shell 10 defines a sump for containing a body of lubricating oil 27 used to lubricate the various bearings, as disclosed in detail in U.S. Pat. No. 3,098,604—Dubberley, assigned to General Electric, the assignee of the present invention. This body of lubricant is preferably of a sufficient depth that the lower end of the crankcase, including the bearing 17, is substantially immersed in the oil and is lubricated by such immersion. For the purpose of providing lubrication for the upper main bearing 16 and crank bearing 19 which are disposed above the body of oil and below the motor 24, there is provided a centrifugal pumping arrangement including a lubricant passage or duct in the shaft 18 having its lower or inlet end below the oil level in the reservoir or sump and an upper outlet on the peripheral surface of the shaft encompassed by and in frictional engagement with the upper bearing 16. This lubricant passage comprises a horizontal, radially extending groove 29 which, with a thrust plate 30, forms a radial passage and a vertical portion or passage 31 parallel to, but offset from, the vertical axis or center of rotation of the shaft. The lower end of the passage 31 communicates with the radially extending groove 29 and the upper end terminates within or slightly above the portion of the shaft journalled in the upper unimmersed bearing 16. To assure lubrication of the lower bearing under varying oil level conditions, this bearing can be force fed by extending groove 29 to the periphery of the shaft.

Adjacent the upper end of the vertical passage 31, there is provided an oil port 34 extending from the passage to the peripheral surface of the shaft within the bearing 16. By this arrangement, oil entering the lower passage 29 through an opening 32 in the thrust plate 30 is subjected to centrifugal force set up by rotation of the shaft flows upwardly along the passageway 31 and outwardly through the oil port 34 to lubricate the bearing surfaces of the upper bearing 16. Intermediate the ends of the shaft 18 and in line with the connecting rod 20 there may also be provided one or more additional ports 35 which is adopted to furnish lubricating oil to bearing 19 formed between the eccentric portion of the shaft and the connecting rod 20.

The compressor is designed to form part of a hermetic refrigeration system either of the type used for cooling only of an enclosure or the heat pump type used for both heating and cooling. In the present instance, as mentioned above, a cooling only system is shown diagrammatically including a condenser 41, an expansion device which may be either an expansion valve or, as shown, a capillary tube 42 and an evaporator 43 connected in closed series flow relationship. During operation of the compressor, low pressure or suction gas is withdrawn from the evaporator 43 through suction inlet 44 in the upper portion of the shell 10. This relatively cool suction gas passes downwardly through the motor 24 between rotor 62 and stator 61 and through a plurality of holes 45 into an annular suction muffler 46 formed in the upper portion of the compressor block 12. The suction gas flows from the muffler 46 into an annular cavity 48 surrounding the forward end of the cylinder 14 and from this cavity through a plurality of suction ports 49 and a suction valve into the interior or chamber 50 of the cylinder 14.

Refrigerant compressed by the reciprocating piston 21 flows from cylinder 14 through a discharge valve (not shown), a discharge muffler 51, and into a discharge line 52 which includes a plurality of loops 54 immersed in the body of oil 27 and is thereafer discharged from the compressor unit through an outlet 55 to the condenser 41.

In accordance with the present invention the motor and the means for controlling operation, including the method thereof, will now be explained in detail. The present motor for single-phase application includes four separate windings, a first motor or set of windings 58 including a two-pole auxiliary and main winding for high-speed compressor operation and a separate motor or set of windings 60 including a four-pole and main winding for low-speed compressor operation, all wound on the same core. This approach to motor design allows the efficiency and torque levels of each set of windings 58 and 60 to be optimized independently.

Typically, the motor 24 which in the present instance includes both sets, the low and high-speed motor windings 58 and 60, respectively, provides a stator 61 and rotor 62 that are constructed from a plurality of individual laminations 63 and 64 respectively. Each of the laminations 63 of stator 61 has a central opening which, when the laminations are arranged in stacked relationship, defines a stator bore 66. The bore 66 is sized to receive the rotor and to provide a predetermined air gap 65 between the inner diameter of the stator 61 and the outer diameter of the rotor 62.

The stator bore 66, as seen in FIG. 2, also has a plurality of receptacles which define a plurality of winding receiving slots 68. Conventionally, the slots extend radially outwardly from the bore 66 and communicate with the bore along one end of the receptacle.

Referring to FIG. 3, there is shown schematically the arrangement of the low and high-speed set of windings 58 and 60, respectively, wherein 70 represents the first or low-speed motor main winding of set 58 which in the present case is shown as a four-pole winding, and 72 represents a second or high-speed motor main winding of set 60 shown in the present case as a two-pole winding. Cooperating with the main winding 70 is the four-pole starting winding 74 and cooperating with the main winding 72 is the two-pole starting winding 76.

It has been determined that under normal operating temperature that the compressor motor will, in fact, operate in the low speed mode approximately between 70% and 95% of the time. It is, therefore, advantageous to design the four-pole low-speed motor windings 60 for maximum efficiency. The operation of the compressor motor 24, driven by windings 58 in the two-pole high-speed mode, is usually during the most adverse conditions when maximum output is required of the system.

By the present invention means are provided to compensate for the fact that the two-pole high-speed motor windings 58 do, in fact, operate in the most adverse conditions. To this end, as shown schematically in FIG. 3, the two-pole motor windings 60 are arranged inwardly in the stator slots relative to the four-pole low-speed motor windings 58. As mentioned hereinbefore, the relatively cool suction gas entering the compressor case through inlet 44 flows through the motor and more, particularly, through the air gap or spacing 65 between the stator and rotor. Accordingly, with the two-pole winding in this inner position, a greater portion of the relatively cool suction gas which is directed over the windings will flow past the two-pole winding as the gas passes through the motor space or air gap 65 between the rotor and stator. This extra degree of cooling allows the present design balance of allocating more winding space to the four-pole low-speed motor winding 58 with the result being optimal motor efficiencies for both speeds. Since the four-pole low-speed motor 58 operates in the more favorable conditions wherein motor cooling is not critical and, therefore, requires less cooling than the two-pole high-speed motor, it can be arranged at the warmer outside position of the stator slots 68 where it sees less of the cool suction gas as it passes through the motor.

Referring now to FIG. 4, there is shown the motor control circuit for the present two-speed compressor unit 11. While the present motor and control system shown is of the single phase type, it should be noted that the same principles of speed and control can be adapted to a three-phase power system. Single phase electrical power from Lines L1, L2 is supplied to the two-pole high speed windings 72,76 and the four-pole low speed windings 70,74 through high and low speed contactor switches 78 and 80 respectively. The operation of both contactor switches, as will be explained hereinafter, is controlled by the low voltage control circuit, including a two-stage comfort control thermostat 82.

Power to the low-speed windings 70,74 from Line 1 flows through conductor 84 to switch 86 of contactor 80, conductor 106, and thence through the low-speed motor overload protector 88. From the overload protector 88, power flows through start winding 74, conductor 91, switch 90, of contactor 80 and conductor 92 and thence through run capacitor 94 to Line L2. The circuit through low-speed start capacitor 96 is completed from conductor 92 through the initially closed contacts 98 of a capacitor switching relay 100. The circuit through the run winding 70 being completed through conductor 102, switch 104, of contactor 80 to Line L2. Relay 100 is energized through conductor 106, 108 to open contact 98 and remove start capacitor 96 from the circuit momentarily after the motor starts.

Power to the high speed windings 72,76 from Line L1 flows through conductor 110 to switch 112 of contactor 78, conductor 113, and thence through the high-speed motor overload protector 114. From the overload protector 114, the circuit to the run winding 72 is completed through a conductor 115, switch 117, of contactor 78 to Line L2. Also from the overload protector 114, power flows through start winding 76, conductor 119, switch 116 of contactor 78, conductor 92, thence through run capacitor 94 to Line L2. The circuit, through high-speed start capacitor 118, is completed from conductor 92 through the initially closed contacts 98 of relay 100, switch 120, of the high-speed switching relay 122 which closes switch 120 when, as will be explained hereinafter, high-speed operation is called for by thermostat 82. Operation of relay 122 also caused a circuit to be completed through a high-speed run capacitor 124 through switch 125. It should be noted that with regard to the start capacitors 96 and 118, that the relay 122 will close its switch 120 to the start capacitor 118, before the relay 100 opens switch 98 to remove capacitor 118. Both the start 118 and the run capacitor 124 will be in the circuit through the high-speed switching relay contacts 120, 125 respectively only when the thermostat calls for high-speed operation of the compressor. It should be noted that while in the present instance two-run capacitors are in the circuit during high speed motor operation, it may be advantageous in certain instances to have two-run capacitors in the circuit during low-speed motor operation. It should be apparent from the above description that the high and low-speed windings in effect function as two separate motors sharing a common stator.

Another feature of the present invention is the motor protection means wherein because of the dual high and low-speed winding arrangement, separate and independent line break protectors 114 and 88 are provided for each of the two-pole and four-pole motor windings respectively. In effect, each winding and protector subsystem can be optimized without affecting the other. This is contrary to the use of temperature-only responsive pilot duty systems that limit motor temperature by opening the incoming power at the main line regardless of which winding is overheated because the systems are not independent. With this present arrangement, it is possible under certain operating conditions for one of the motor windings to remain operational when the line break protector associated with the other set of the motor windings opens its respective circuit. For example, in the event the line break protector 88 associated with the low-speed motor windings 70,74 sensing an abnormal condition opens the circuit thereto, the compressor can operate in the high-speed mode through windings 72,76 if temperature conditions are such that the thermostat, as will be explained below, calls for high-speed operation. With the rotor 62 rotating clockwise, as indicated by the arrow in FIG. 3, the line break protectors 88 and 114 are positioned tangentially relative to the suction inlet 44 so that the high-speed breaker 114 is downstream of the suction flow from the low-speed breaker 88. Due to the higher rotor speed of the motor, the suction gas entering inlet 44 is carried further in the direction of the arrow in high-speed relative to low-speed. With this present arrangement, the high speed motor line break protector 114 sees more of the relatively cool suction gas when the motor is operating at high speed and, accordingly, allows for a balanced protection between protectors since they see substantially similar boundary conditions such as gas flow, motor temperatures and surrounding internal compressor temperatures. Because of protector design, it is imperative that they be cooled so that they remain closed under normal operating conditions; otherwise, the internal energy they generate would be enough to cause them to self trip.

Reference will now be made to the low voltage control portion of the circuit wherein a transformer 126 has its primary connected to power Lines L1, L2. Power to the two-stage thermostat 82 is fed from one side of the transformer secondary to the first and second stage stationary contacts 128 and 130 of first and second stage switches 132 and 134 respectively. In cooling, a rising temperature first causes movable contact 136 of first stage switch 134 to engage contact 130. Closing of switch 134 completes a low-voltage circuit through the switch 138 of the speed switching relay 140. The switch 138 is normally in the position shown and power flows through stationary contact 142 to energize the low-speed contactor relay coil 143 which causes all of the contacts 84, 90 and 104 of the low-speed contactor 80 to close. Accordingly, power is applied to low-speed motor 60 and the compressor will operate at low speed through low-speed windings 70 and 74 as described hereinabove.

If the temperature continues to rise, it causes movable contact 144 of switch 132 to engage contact 128. Closing of switch 132 completes a first low-voltage circuit through a high-speed capacitor switching relay 122 which, as mentioned above, causes closing of switches 120 and 125 to complete the circuits through the high-speed start and run capacitors 118 and 124 respectively to complete the circuits necessary for high-speed operation of motor 58 so that the compressor will operate at high speed through windings 72 and 76 as described. At the same time, a circuit is also completed from switch 132 through a time delay relay 146. The delay action of relay 146 causes its switch 148 to close after a predetermined time delay which, in the present instance, is approximately between thirty seconds and two minutes. Closing of switch 148 after the appropriate time delay completes a circuit through the speed switching relay 140, causing switch 138 to move to stationary contact 150 to energize high speed contactor relay coil 152 which causes all of the contacts 112, 116 and 117 of the high-speed contactor 78 and, accordingly, the compressor will operate through motor 58 at high speed through the high-speed windings 72,76 as described above.

The time delay relay 146 and its arrangement in the circuit relative to the speed switching relay 140 provides a delay in switching from one speed to the other and at the same time provides mandatory low-speed start regardless of temperature or thermostat demands. Assuming with the system shut down that temperature conditions are such that high speed operation is required and the second stage switch 132 is closed. In this instance at start up, a circuit is established through relay 146. In this mode the system would still start at low speed through contact 142 until the required delay period is over and switch 148 closes to energize relay 140 and move its switch 138 to the high speed contact 150. This mandatory slow-speed start allows initial slower pressure reduction in the case 11 which results in less or slower boiling off of refrigerant out of the oil. Starting the compressor at high speed can result in a sudden crank case pressure drop which can cause a boiling action of the refrigerant. If the boiling action is violent enough, it will carry off oil with the refrigerant and/or cause a foaming action and, as a result, adversely affect the lubricating system of the compressor. In either instance, this lack of oil available to the compressor bearings can result in bearing failure. In some instance, some of the oil by or mixed with refrigerant can be drawn into the cylinder where its inability to compress can also result in bearing failure.

In the case of two phasing between oil and refrigerant, the heavier refrigerant is in the bottom of the sump and will be drawn into the bearings rather than the oil. In the low-speed start, heat build up is allowed to boil off refrigerant before bearing damage can result. In most instances, the mandatory low-speed start will eliminate the liquid refrigerant problems associated with compressor start up and reduce or eliminate the need for sump heaters.

Another feature of the present control is the ability to switch between speeds without stopping the motor operation of the compressor. The present control allows instantaneous switching after a predetermined time delay without stopping compressor operation. In operation with the compressor operating at high speed, the second stage thermostat switch 132 may open and control is through first stage switch 134 calling for low speed. At this time, the time delay relay 146 is de-energized. Because of the time delay built into relay 146, the compressor continues to operate at high speed until the delay period expires, at which time switch 148 opens and relay 140 is de-energized, causing switch 138 to move from contact 150 to 142 to complete the circuit to the low speed contactor relay 143, at which time the motor is instantaneously switched to low speed without interrupting operation of the compressor. Switching from low to high speed is accomplished in the same manner, with the compressor operating during the delay period without motor shutdown.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:
1. In a hermetic refrigerant compressor of the type having a sealed outer casing containing a compression mechanism for receiving refrigerant gas from a suction line, compressing the refrigerant gas and discharging the compressed refrigerant gas through a discharge line, and a motor for rotating drive shaft means in the compression mechanism at low speed and at high speed from a source of single phase electrical power, said motor comprising:

a slotted magnetic core;

a low speed four-pole main winding fitted substantially evenly into said slotted magnetic core, a four-pole auxiliary winding fitted in said slotted core in a location adjacent said low speed main winding;

a high speed two-pole winding fitted in said slotted core, a two-pole auxiliary winding fitted in said slotted core in a location adjacent said high speed two-pole auxiliary winding;

a first line break motor protector arranged in intimate thermal contact with said low speed four-pole main and auxiliary winding being connected electrically in series between said power source and said winding for controlling power to said four-pole winding independent of said two-pole winding; and a second line break motor protector arranged in intimate thermal contact with said high speed two-pole main and auxiliary windings being connected electrically in series between said power source and said winding for controlling power to said two-pole winding independent of said four-pole winding whereby said compression mechanism may operate at one of said speeds when the line break of the other speed disconnects its associated winding from said power source.

2. The hermetic refrigerant compressor recited in claim 1 wherein said four-pole main winding is located in the radially outer location of said slotted magnetic core, and said two-pole main winding is in a location in said slotted core radially inwardly of said four-pole winding.

3. The hermetic refrigerant compressor recited in claim 2 wherein said low speed four-pole auxiliary winding is fitted in said slotted core in a location radically inwardly of said low speed main winding.

4. The hermetic refrigerant compressor recited in claim 3 wherein said high speed two-pole auxiliary winding is fitted in said slotted core in a location radially inwardly of said high speed main winding.

5. A control system for a hermetic refrigerant motor compressor of the type having a sealed outer casing containing a compression mechanism for receiving refrigerant gas from a suction line, compressing the refrigerant gas and discharging the compressed refrigerant gas through a discharge line, and a motor for rotating drive shaft means in the compression mechanism at low speed and at high speed from a source of single phase electrical power, (A) said motor including a slotted magnetic core;
 (1) a low speed four-pole main winding fitted substantially evenly into radially outer locations of said slotted magnetic core, a four-pole auxiliary winding fitted in said slotted core in a location adjacent said low speed main winding;
 (2) a high speed two-pole main winding fitted in said slotted core, a two-pole auxiliary winding fitted in said slotted core in a location adjacent said high speed two-pole auxiliary winding;
 (3) a first line break motor protector arranged between said low speed four-pole main and auxiliary windings being connected electrically in series between said power source and said windings for controlling power to said four-pole winding independent of said two-pole winding;
 (4) a second line break motor protector arranged between said high speed two-pole main and auxiliary windings being connected electrically in series between said power source and said winding for controlling power to said two-pole winding independent of said four-pole winding whereby said compression mechanism may operate at one of said speeds when the line break protector of the other speed disconnects its associated windings from said power source;

(B) said control system including temperature-responsive switching means having a first stage switch means and a second stage switch means;
 (1) a speed selection switch means arranged in series with said first stage switch means being operable between a normal low speed position for connecting said four-pole windings to said power source, to a high speed position for connecting said two-pole winding to said power source;
 (2) high speed switch means arranged in series with said second stage switch means including delay switch means operable after a predetermined time period for switching said speed selection switch between said normal low speed position and said high speed position so that operation of said motor is instantaneously switched between said four-pole winding and said two-pole windings after said predetermined time delay without interrupting operation of said compression mechanism.

6. The control system for a hermetic refrigerant compressor recited in claim 5 wherein said speed selection switch means includes a relay energized through said delay switch means for moving said speed selection switch from said normal low-speed position to said high-speed position.

7. The control system for a hermetic refrigerant compressor recited in claim 6 wherein said four-pole main winding is located in the radially outer location of said slotted magnetic core, and said two-pole main winding is in a location in said slotted core radially inwardly of said four-pole winding.

8. The control system for a hermetic refrigerant compressor recited in claim 7 wherein said low speed two-pole auxiliary winding is fitted in said slotted core in a location radially inwardly of said low speed main winding.

9. The control system for a hermetic refrigerant compressor recited in claim 8 wherein said high speed four-pole auxiliary winding is fitted in said slotted core in a location radially inwardly of said high speed main winding.

10. The method of providing a hermetic refrigerant compressor of the type having a sealed outer casing containing a compression mechanism for receiving refrigerant gas from a suction line, compressing the refrigerant gas and discharging the compressed refrigerant gas through a discharge line, and a motor for rotating drive shaft means in the compression mechanism at low speed and at high speed from a source of single phase electrical power, comprising:

providing a slotted magnetic core;

arranging a low-speed, four-pole main winding substantially evenly into said slotted magnetic core, a four-pole auxiliary winding fitted in said slotted core in a location adjacent said low-speed main winding; and arranging a high-speed two-pole main winding in said slotted core, a two-pole auxiliary winding fitted in said slotted core in a location adjacent said high-speed two-pole auxiliary winding.

11. The method of providing the hermetic refrigerant compressor recited in claim 10 wherein said four-pole main winding is arranged in the radially outer location of said slotted magnetic core, and said two-pole main winding is in a location in said slotted core radially inwardly of said four-pole winding.

12. The method of providing the hermetic refrigerant compressor recited in claim 11 wherein said low-speed four-pole auxiliary winding is arranged in said slotted core in a location radially inwardly of said low-speed main winding.

13. The method of providing the hermetic refrigerant compressor recited in claim 12 wherein said high-speed two-pole auxiliary winding is arranged in said slotted core in a location radially inwardly of said high speed main winding.

14. The method of providing a control system for a hermetic refrigerant motor compressor of the type having a sealed outer casing containing a compression mechanism for receiving refrigerant gas from a suction line, compressing the refrigerant gas and discharging the compressed refrigerant gas through a discharge line, and a motor for rotating drive shaft means in the compression mechanism at low speed and at high speed from a source of single phase electrical power, comprising:

(A) providing said motor with a slotted magnetic core;
  (1) arranging a low-speed four-pole main winding substantially evenly into radially outer locations of said slotted magnetic core, a four-pole auxiliary winding fitted in said slotted core in a location adjacent said low-speed main winding;
  (2) arranging a high-speed two-pole main winding in said slotted core, a two-pole auxiliary winding fitted in said slotted core in a location adjacent said high-speed two-pole auxiliary winding;
  (3) arranging a first line break motor protector arranged between said low-speed four-pole main winding being connected electrically in series between said power source and said winding for controlling power to said four-pole winding independent of said two-pole winding;
  (4) arranging a second line break motor protector arranged between said high speed two-pole main windings being connected electrically in series between said power source and said winding for controlling power to said two-pole winding independent of said four-pole winding whereby said compression mechanism may operate at one of said speeds when the line break of the other speed disconnects its associated winding from said power source;

(B) providing said control system with a temperature-responsive switching means having a first stage switch means and a second stage switch means;
  (1) providing a speed selection switch means arranged in series with said first stage switch means being operable between a normal low-speed position for connecting said four-pole windings to said power source, to a high-speed position for connecting said two-pole winding to said power source;
  (2) providing high-speed switch means arranged in series with said second stage switch means including delay means operable after a predetermined time period for switching said speed selection switch from said normal low-speed position to said high-speed position so that operation of said motor is instantaneously switched from said four-pole winding to said two-pole windings after said predetermined time delay without interrupting operation of said compression mechanism.

15. The method of providing the control system for a hermetic refrigerant compressor recited in claim 14 wherein said speed selection switch means is provided with a relay that is energized through said delay switch means for moving said speed selection switch from said normal low-speed position to said high-speed position.

16. The method of providing the control system for a hermetic refrigerant compressor recited in claim 15 wherein said four-pole main winding is located in the radially outer location of said slotted magnetic core, and said two-pole main winding is in a location in said slotted core radially inwardly of said four-pole winding.

17. The method of providing the control system for a hermetic refrigerant compressor recited in claim 16 wherein said low-speed four-pole auxiliary winding is fitted in said slotted core in a location radially inwardly of said low-speed main winding.

18. The method of providing the control system for a hermetic refrigerant compressor recited in claim 17 wherein said high-speed two-pole auxiliary winding is fitted in said slotted core in a location radially inwardly of said high-speed main winding.

* * * * *